Sept. 22, 1931.　　　　D. SCOATES　　　　1,823,916
NOVELTY MAP
Filed July 5, 1929
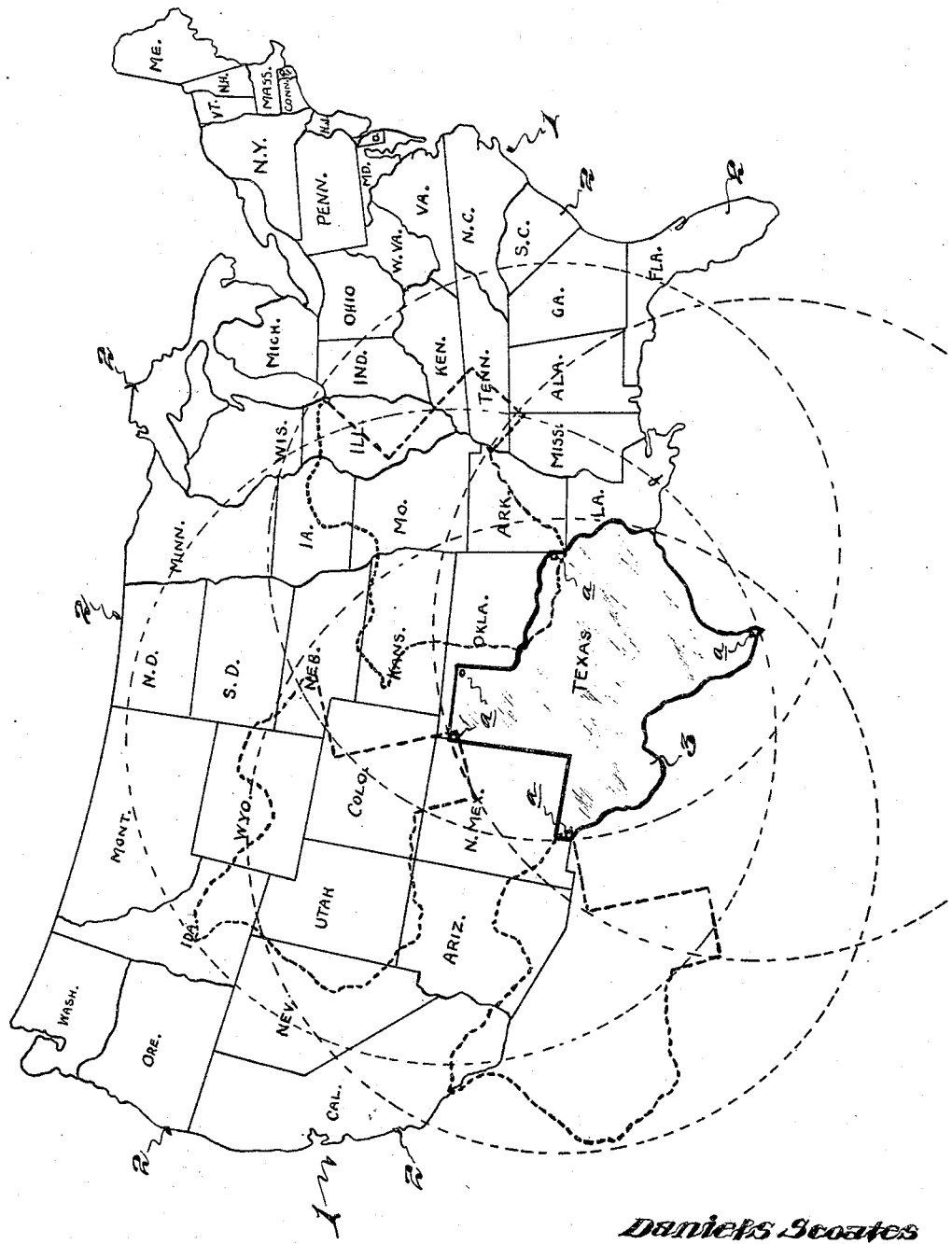
Daniels Scoates
INVENTOR.
BY
ATTORNEY Patented Sept. 22, 1931

1,823,916

UNITED STATES PATENT OFFICE

DANIELS SCOATES, OF COLLEGE STATION, TEXAS

NOVELTY MAP

Application filed July 5, 1929. Serial No. 376,022.

This invention relates to novelties and particularly to advertising novelties and its principal object resides in the provision of a map with one or a series of maps, representative of certain geographical areas or surveys, pivoted or otherwise fixed thereto for movement over said first map for the purpose of determining the area of the latter encompassed by the smaller map by moving the same on its pivot over the surface of the map.

Another object of the invention resides in the provision of a novelty of the character specified whereby any geographical area, such as a town, county or parish, a State, a group of States or even nations, may be moved relative to the adjacent territories as a medium through which chambers of commerce or other organizations of public benefit, may advertise and circulate matter describing the products of their respective localities, as well as for the purpose of contrasting the customs and characteristics of their localities with those of adjacent territories over which the area of their loosely connected localities is moved in the manner to be hereinafter explained.

With the foregoing objects as paramount, the invention has particular reference to its salient features as a novelty to be hereinafter described and explained in detail, taken in connection with the accompanying drawing wherein the single figure represents a map of the United States on which the map of Texas is pivoted for movement, dotted lines exemplifying the area covered by the State of Texas when the latter is pivoted at four marginal points and rotated.

While a drawing of a map of the United States is herein illustrated as an example, it is very obvious that any other geographical area may serve equally as well in illustrating the purpose and intent of the invention.

The character 1 designates the larger area, usually made of many States, colonies or parishes 2, which latter are in turn composed of a number of geographically divided countries and their cities.

In advertising or exploiting the products of a certain State or locality, or in settling up certain communities within a predetermined area in such State or locality, it is effective from the standpoint of advertising that the State, county or locality be so arranged relative to the union as to be capable of being moved about in order to bring the advertised area figuratively into close proximity of desirable localities in the adjacent States, as well as to demonstrate the size of State or locality. In some cases it is possible to demonstrate the distance between two localities in carrying out advertising campaigns along the lines previously mentioned.

The invention is of particular benefit to chambers of commerce and organizations having business of a similar nature in advertising trade activities in their respective jurisdictions simply by pivoting to a State or national map a map of their own locality on the latter's border line at a desirable point, or at such point that its extreme opposite line may be moved over the adjacent territory, demonstrating the maximum adjacent territory covered by such locality.

In the drawing, 3 designates a State or predetermined area, shown to be pivoted at $a$ to a larger area of which it forms a unit. The dotted lines of this unit illustrate various positions thereof as it is moved over the union, while the circular dotted lines are indicative of the area described by the State or locality 3 when the latter is moved from one of the several pivoted points $a$ adjacent its boundary line, in a circular motion. It will be noted that in so moving the map, its area can be determined according to its surrounding territory.

Manifestly, the arrangement described is capable of alteration in some respects, such as providing a pivoted point for a smaller area on the larger area from which the former is rotated, and it is also apparent that geographical locations and surveys other than those illustrated may be used without departing from the spirit or intent of the invention as set forth in the following claims.

What is claimed is:

1. A novelty including a map having a smaller map superimposed theron representative of a predetermined area of said first map and means to secure said superimposed map at several points whereby the same may be moved in a series of circles over said first map.

2. A novelty in which a transparent representation of a map is superimposed upon a non-transparent map and pivoted to be moved over the surface of said non-transparent map.

In testimony whereof I affix my signature.

DANIELS SCOATES.